United States Patent
McMaster

(10) Patent No.: US 10,184,219 B2
(45) Date of Patent: Jan. 22, 2019

(54) BARRIER CONNECTION SYSTEM AND CONNECTOR FOR USE THEREIN

(71) Applicant: SAFEROADS PTY LTD, Drouin (AU)

(72) Inventor: Casey McMaster, Drouin (AU)

(73) Assignee: SAFEROADS PTY LTD, Drouin (AU)

( * ) Notice: Subject to any disclaimer, the term of this patent is extended or adjusted under 35 U.S.C. 154(b) by 0 days.

(21) Appl. No.: 15/193,351

(22) Filed: Jun. 27, 2016

(65) Prior Publication Data

US 2016/0369461 A1   Dec. 22, 2016

Related U.S. Application Data

(63) Continuation-in-part of application No. 14/795,064, filed on Jul. 9, 2015.

(30) Foreign Application Priority Data

Jul. 11, 2014 (AU) .............................. 2014902682

(51) Int. Cl.
| | | |
|---|---|---|
| *E01F 15/08* | (2006.01) | |
| *F16B 5/00* | (2006.01) | |
| *E04H 17/16* | (2006.01) | |

(52) U.S. Cl.
CPC .......... *E01F 15/088* (2013.01); *E01F 15/083* (2013.01); *E01F 15/085* (2013.01); *E04H 17/16* (2013.01); *F16B 5/008* (2013.01)

(58) Field of Classification Search
CPC ................................ E01F 15/08; E01F 15/083
USPC ...................... 404/6; 256/13.1; 405/274, 278
See application file for complete search history.

(56) References Cited

U.S. PATENT DOCUMENTS

| | | | | |
|---|---|---|---|---|
| 838,152 | A | * | 12/1906 | Williams |
| 3,918,131 | A | | 11/1975 | Ausnit |
| 4,008,575 | A | | 2/1977 | Gallagher |
| 4,113,400 | A | | 9/1978 | Smith |
| 4,155,664 | A | * | 5/1979 | Acheson ................. E02B 15/08 403/317 |
| 4,333,726 | A | | 6/1982 | Fuxelius |

(Continued)

FOREIGN PATENT DOCUMENTS

WO   WO-2010057233 A1 *  5/2010 ............ E01F 15/083

OTHER PUBLICATIONS

"U.S. Appl. No. 14/795,064, Non Final Office Action dated Mar. 30, 2016", 8 pgs.

*Primary Examiner* — Thomas B Will
*Assistant Examiner* — Katherine J Chu
(74) *Attorney, Agent, or Firm* — Schwegman Lundberg & Woessner, P.A.

(57) ABSTRACT

An example barrier connection system comprises at least one pair of connectors, each connector including a mounting section for attachment to a barrier, the mounting section having inner and outer faces, and first and second connector elements at respective sides of the mounting section. In one example, the first connector element comprises an inwardly extending flange that is spaced from the inner face of the mounting section to at least partially define a recess there between. The second connector element comprises an outwardly extending flange. The inwardly and outwardly extending flanges are dimensioned and orientated such that, in use, the outwardly extending flange of each connector is receivable within the recess of the other connector.

15 Claims, 3 Drawing Sheets

(56) References Cited

U.S. PATENT DOCUMENTS

| | | | | |
|---|---|---|---|---|
| 4,808,039 A * | 2/1989 | Fischer | E02D 5/08 | 405/129.8 |
| 4,863,315 A * | 9/1989 | Wickberg | E02D 5/08 | 405/274 |
| 5,149,224 A * | 9/1992 | Smith | E01F 15/083 | 256/13.1 |
| 5,464,306 A | 11/1995 | Cristiano | | |
| 5,588,187 A * | 12/1996 | Swain | A44B 19/16 | 24/400 |
| 5,782,583 A * | 7/1998 | Vales | E02D 5/04 | 405/281 |
| 5,911,546 A * | 6/1999 | Vales | E02D 5/04 | 405/276 |
| 5,921,716 A * | 7/1999 | Wickberg | E02D 5/02 | 405/278 |
| 6,033,155 A * | 3/2000 | Irvine | E02D 5/02 | 405/274 |
| 6,234,707 B1 * | 5/2001 | Maier-Hunke | F16B 5/0032 | 403/331 |
| D471,794 S * | 3/2003 | Wall | D25/119 | |
| D521,364 S * | 5/2006 | Wall | D8/382 | |
| D542,642 S * | 5/2007 | Heindl | D8/382 | |
| 7,494,112 B2 * | 2/2009 | Fromm | E01F 13/12 | 256/64 |
| D626,826 S * | 11/2010 | Austro | D8/382 | |
| D626,827 S * | 11/2010 | Austro | D8/382 | |
| 7,857,550 B2 * | 12/2010 | Heindl | E02D 5/08 | 403/403 |
| D649,443 S * | 11/2011 | Heindl | D8/382 | |
| 8,047,745 B2 * | 11/2011 | Heindl | E02D 5/02 | 405/278 |
| D666,484 S * | 9/2012 | Heindl | D8/382 | |
| 8,388,257 B2 | 3/2013 | Redlberger | | |
| D681,424 S * | 5/2013 | Heindl | D8/382 | |
| D681,427 S * | 5/2013 | Heindl | D8/382 | |
| 8,568,057 B2 * | 10/2013 | Rodriguez | E01F 15/083 | 256/13.1 |
| D724,423 S * | 3/2015 | McShane | D8/382 | |
| 9,988,778 B2 * | 6/2018 | Barnas | E01F 15/088 | |
| 2011/0229261 A1 | 9/2011 | Redlberger | | |
| 2014/0270986 A1 * | 9/2014 | Irvine | E02D 5/03 | 405/274 |
| 2016/0010294 A1 | 1/2016 | Mcmaster | | |

\* cited by examiner

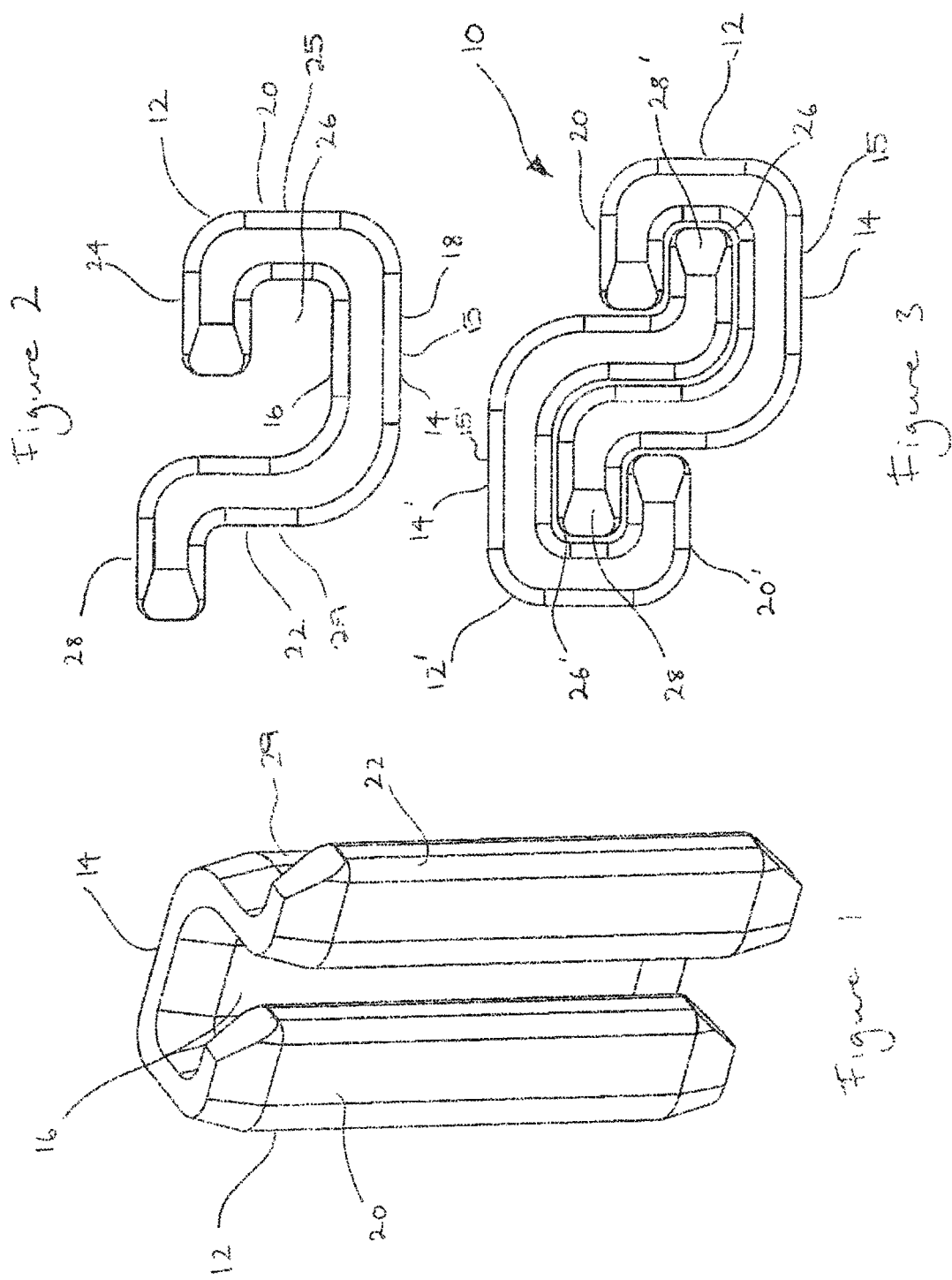

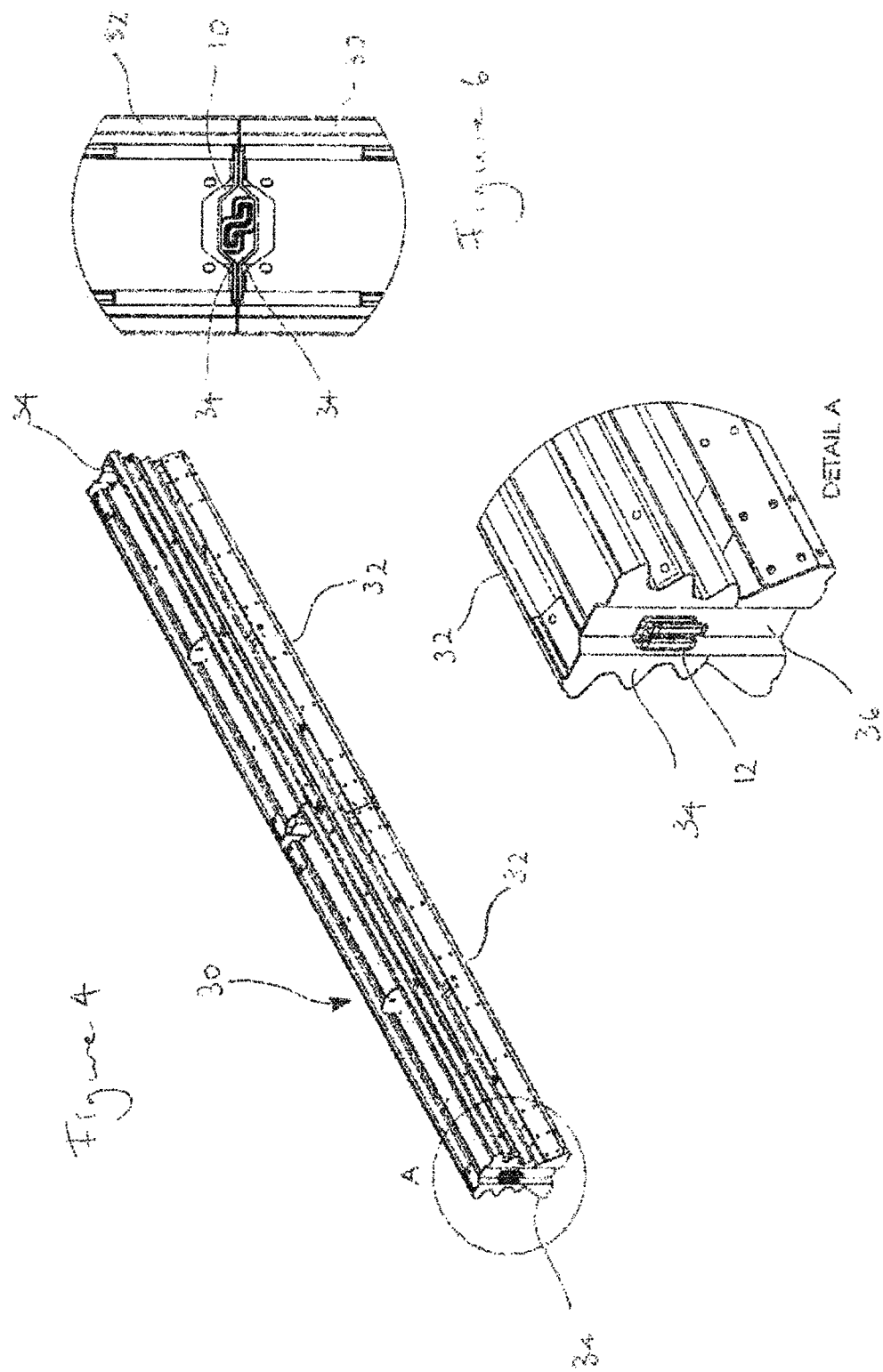

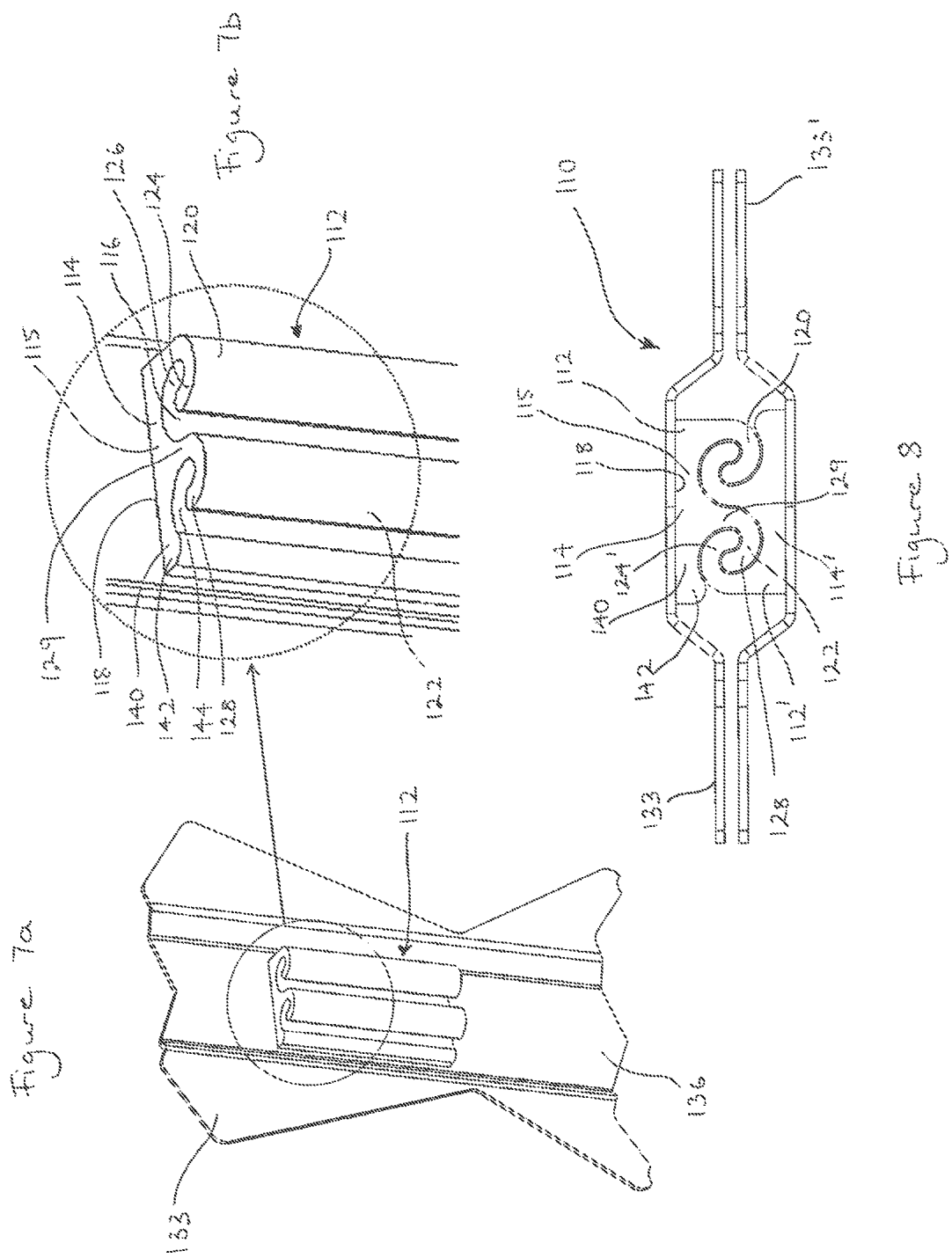

BARRIER CONNECTION SYSTEM AND CONNECTOR FOR USE THEREIN

CROSS REFERENCE TO RELATED APPLICATION(S)

The present application is a continuation-in-part application of and claims priority benefit from U.S. patent application Ser. No. 14/795,064 filed on Jul. 9, 2015 and entitled "BARRIER CONNECTION SYSTEM AND CONNECTOR FOR USE THEREIN," which claims the benefit of priority to Australian Application No. 2014902682, filed Jul. 11, 2014, both of which are incorporated herein by reference.

FIELD

The present disclosure relates to a connection system for barriers. It particularly relates to a connection system for roadway barriers. The present disclosure also relates to a connector for use in the connection system of the disclosure. The present disclosure also relates to a method of connecting barriers using the connection system of the disclosure.

The present disclosure relates particularly, although by no means exclusively, to a connection system that utilizes a pair of connectors wherein each connector has the same configuration.

BACKGROUND

Known roadway barriers include:
(a) barriers made from concrete that rely on the weight of the concrete to function as barriers and typically weigh 1,000 kg per meter of the length of the barrier;
(b) barriers that comprise shells made from plastics materials that are adapted to be filled with water and rely on the weight of the water to function as barriers and typically weigh at least 300 kg per meter of the length of the barrier; and
(c) barriers made from steel which also rely on the weight of the barriers to function as barriers and weigh at least 200 kg per meter of the length of the barrier and, in many instances are fixed to the ground.

Roadway barriers are typically constructed from a number of barrier units that are transported and connected together on site. The barriers often include complementary members at the ends of the barrier units for allowing a plurality of barrier units to be connected together in end-to-end relationship in a line of the barrier units.

There is a number of existing connection systems for roadway barriers.

Many existing connection systems utilize a combination of different connection elements that together interact in order to connect the respective barrier units together. For example, some systems employ a male and a female component, with the male component provided on one end of a barrier unit and the female component on the other end of the barrier unit. Connection of such barriers requires correct orientation of adjacent barriers to ensure engagement of the male component of one barrier with the female component of an adjacent barrier, and vice versa.

Other systems may require use of extrinsic components, such as pins or rods, to connect adjacent barrier units, which results in complex and multicomponent systems and may add to manufacturing expense.

The barrier may include complementary members at the ends of the barriers for allowing a plurality of barriers to be connected together in end-to-end relationship in a line of the barriers.

There is a need for a barrier connection system that has a simple design, does not require multiple different components and is independent of orientation of barrier units.

The above description of prior art barrier connection systems is not to be taken as an admission of the common general knowledge in Australia or elsewhere.

SUMMARY

The present disclosure provides a barrier connection system comprising at least one pair of connectors, each connector including:

a mounting section for attachment to a barrier, the mounting section having inner and outer faces;

first and second connector elements at respective sides of the mounting section;

the first connector element comprising an inwardly extending flange that is spaced from the inner face of the mounting section to at least partially define a recess therebetween;

the second connector element comprising an outwardly extending flange;

the inwardly and outwardly extending flanges being dimensioned and orientated such that in use, the outwardly extending flange of each connector is receivable within the recess of the other connector.

As noted above, the mounting section has inner and outer faces. In this context, the terms "inner" and "outer" are determined relative to the pair of connectors 12. The inner face of the mounting section is located between the first and second connector elements. The outer face is located so as to face, and possibly contact, the barrier surface when mounted thereto.

The present disclosure also provides a connector for use in the barrier connection system of the disclosure.

The present disclosure also provides a barrier unit including a connector at respective ends of the barrier unit.

The present disclosure also provides a method of constructing a barrier using the barrier connection system of the disclosure.

In an embodiment, the outwardly extending flange of the second connector element is generally parallel to the inwardly extending flange of the first connector element. In an embodiment, the outwardly extending flange comprises a male coupling member and the recess defined by the inwardly extending flange and the inner face of the mounting section comprises a female coupling member. The dimensions of each female coupling member are slightly larger than those of each male coupling member in order to allow for receipt of the latter into the former.

In an embodiment, the inwardly and outwardly extending flanges are both curved in cross section. The respective cross sections may be substantially the same. The inwardly and outwardly extending flanges may be substantially arcuate in transverse cross section. The flanges may comprise respective segments of a circle.

In an embodiment, the inwardly and outwardly extending flanges of respective connectors engage each other in use. The engagement may comprise two spaced apart areas of contact between the connectors. The areas of contact may be laterally spaced apart. This arrangement enhances the stability of the connector system as compared to a connector system that comprises only a single contact point. For example one prior art connector system comprises two "J" shaped hooks that extend from respective ends of adjacent barrier units. Such single contact point connector systems often allow undesirable pivoting movement between the barrier units which can undermine the rigidity and strength of the constructed barrier and may result in lengthwise twisting of the barrier in response to vehicle impact.

The inwardly and outwardly extending flanges of respective connectors may be of similar dimensions. In an embodiment, the inwardly and outwardly extending flanges of respective connectors are of substantially identical dimensions.

In an embodiment, the outwardly extending flange is spaced from the plane of the mounting section by a greater amount than the inwardly extending flange. In another embodiment, the outwardly and inwardly extending flanges are spaced from the plane of the mounting section by substantially the same amount. In other words, the outwardly and inwardly extending flanges are spaced from the outer face of the mounting section by substantially the same amount. This thereby allows the outwardly extending flange of one connector to be received in the recess of another connector.

A respective web may extend between each of the outwardly and inwardly extending flanges and the mounting section. In one embodiment, the web joining the outwardly extending flange and the mounting section may be longer than the web between the inwardly extending flange and the mounting section. This arrangement enables the spacing of the outwardly extending flange the required further distance from the mounting section. In another embodiment, the webs respectively joining the outwardly and inwardly extending flanges and the mounting section are substantially the same length.

The mounting section may be attached to an end of a barrier unit. The mounting section may be attached to the outer surface of an end wall of the barrier unit.

The mounting section is attachable to a barrier unit by any suitable means. It may be attached by fasteners such as screws or bolts. It could also be attached by welding (eg where the barrier unit is made from metal).

Alternatively, the mounting section may be set into a concrete barrier unit during casting of the concrete. Other components may be provided on the connector prior to connection to the barrier unit. For example, a reinforcing bar or brackets may be attached to the connector prior to casting in concrete.

In one preferred embodiment, the barrier unit comprises an external metal shell containing ballast. The ballast may comprise concrete. The metal shell may comprise steel. The metal shell may comprise two end walls joining two or more side walls. The mounting section may be mounted to the outer surface of an end wall of the shell.

In an embodiment, each connector is of unitary construction. This greatly reduces complexity and cost of manufacture and simplifies operation of the connector.

The connector may be made from metal. A suitable metal is steel. The connector may be made from metal sheet or plate that is cut and bent to form the connector. Alternatively, the metal may be cast or forced. In one embodiment, the connector is formed from steel plate having a thickness of 12 mm. The steel may be Grade 350 steel.

The connector may instead be made from a suitable alternative material. For example, the connector may comprise a plastics material, such as polycarbonate, and be manufactured by alternative means such as molding or casting.

The connector system may comprise one or more pairs of connectors. Each connector may comprise an elongate body having a longitudinal axis that extends substantially vertically of the of the barrier unit in use.

The connector system may comprise a single pair of elongate connectors. Alternatively, the connector system may comprise two or more pairs of connectors that, in use, are vertically spaced along the ends of adjacent barrier units.

The present disclosure also provides a barrier assembly including a plurality of the above-described barrier units connected together in end-to-end relationship by the connection system of the disclosure.

Advantages of the present disclosure include:

a simple, self-contained, one component connection system that is independent of orientation of the barrier units.

It does not require the use of extrinsic components such as pins or bolts in order to join respective connectors. This greatly simplifies barrier construction and reduces manufacturing cost.

BRIEF DESCRIPTION OF THE DRAWINGS

The present disclosure is described further by way of example with reference to the accompanying drawings, of which:

FIG. 1 is a perspective view of a first embodiment of a connector for use in the connection system.

FIG. 2 is a plan view of the connector of FIG. 1.

FIG. 3 is a plan view of a connection system including first embodiments of a connector.

FIG. 4 is a perspective view of a barrier constructed using the connector system of FIG. 3.

FIG. 5 is a perspective view of an end of a barrier unit of FIG. 4.

FIG. 6 is a plan view of the connected ends of adjacent barrier units using the connection system of FIG. 3.

FIG. 7a is a perspective view of a second embodiment of a of a connector attached to an end wall of a barrier unit.

FIG. 7b is a magnified view of the connector shown in FIG. 7a.

FIG. 8 is a plan view of a connection system including second embodiments of a connector attached to respective end walls of a barrier unit.

DETAILED DESCRIPTION

With reference to FIGS. 1 to 3, a connection system 10 is shown that comprises a pair of connectors 12. Each connector 12 includes a mounting section 14 for attachment to a barrier end. The mounting section 14 comprises a mounting web 15 that includes an inner face 16 and an outer face 18, wherein the terms "inner" and "outer" are determined relative to the pair of connectors 12.

First and second connector elements, 20, 22, are provided at respective sides of the mounting section 14. The inner face 16 is located between the first and second connector elements, 20, 22. The first connector element 20 includes an inwardly extending flange 24 and a first web portion 25 extending between the flange 24 and a first side of the mounting section 14. The flange 24 is spaced from the inner face 16 of the mounting section 14 to at least partially define a recess 26 therebetween.

The second connector element 22 includes an outwardly extending flange 28 and a second web portion 29 extending between the flange 28 and the second side of the mounting section 14.

In the embodiment illustrated in FIG. 3, both connectors are substantially identical.

The inwardly and outwardly extending flanges are dimensioned and orientated such that in use, the outwardly extending flange 28 of one connector 12 is receivable within the recess 26' of the other connector 12' (refer to FIG. 3). The dimensions of the recess 26 complement the shape and size of the outwardly extending flange 28. Accordingly, when one connector 12" is rotated 180° with respect to the other connector 12, (for example, when the connectors are attached to ends of adjacent barrier units), the outwardly extending flange of each connector is receivable in a respective recess of the other connector.

FIG. 4 shows a roadside barrier 30 comprising a series of interconnected steel barrier units 32 (only two barrier units are illustrated). Each barrier unit 32 includes two end faces 34. Each end face 34 includes a substantially vertically orientated channel 36. A connector 12 is provided on or attached to the end face 34 within the channel 36. By locating the connector 12 within the channel 36 it is protected from damage during handling and transport.

The barrier units are connected together by vertically aligning the respective connectors of adjacent barrier units, then carefully lowering one barrier unit into engagement with the other, such that the two connectors engage each other as previously described. The ends of the connectors are preferably chamfered in order to assist the location of the connectors during this operation. FIG. 6 is a plan view of the connector system 10 at the junction between two connected barrier units 32.

With reference to FIGS. 7a, 7b and 8, a second embodiment of a connection system 110 is shown in which like reference numerals refer to like parts.

The connection system 110 comprises a pair of connectors 112, 112'. Each connector 112, 112' is formed from cast metal, preferably steel. Each connector 112, 112' includes a mounting section 114 for attachment to a barrier end wall 133. Each mounting section 114 comprises a mounting web 115 that includes a curved inner face 116 and a substantially planar outer face 118, wherein the terms "inner" and "outer" are determined relative to the pair of connectors 112, 112'.

The barrier end wall is formed from pressed sheet metal, and is preferably steel. The barrier end wall 133 includes a central channel 136 that houses the connector 112. The channel 136 is substantially vertically orientated.

First and second connector elements, 120, 122, are provided at respective sides of the mounting section 114. The curved inner face 116 is located between the first and second connector elements, 120, 122. The first connector element 120 includes an arcuate, inwardly extending flange 124, having a generally "C-shaped" cross section, and a first web portion 125 comprising a neck extending between the flange 124 and a first side of the mounting section 114. The flange 124 is spaced front the inner face 116 of the mounting section 114 to at least partially define a curved recess 126 therebetween.

The second connector element 122 includes an arcuate, outwardly extending flange 128, also having a generally C-shaped cross section, and a second web portion 129 in the form of a neck extending between the flange 128 and the second side of the mounting section 114. The mounting section 114 includes a lateral extension 140 in the form of a bracing shoulder 142 having a contour complementary to the outer curvature of the flange 124' of the opposed connector 112'. The shoulder 142, flange 128 and web portion 129 together define a curved recess 144 for accommodating the arcuate flange 124' of the opposed connector 112'. The curved recess 144 is of similar size and shape to that of the curved recess 126. The bracing shoulder 142 provides bracing support against the laterally outer side of the arcuate flange 124' and thereby stabilises the engagement of the two connectors 112, 112'.

Each of the curved recesses 126 and 144 has a shape that is complementary to that of flanges 128 and 124, respectively. The arcuate shape of the flanges and corresponding recesses improves the engagement between them when the pair of connectors 112, 112' is interconnected. Without wishing to be limited to theory, it is believed that the curved nature of the connector elements improves the strength of the connection against forces perpendicular to the length of the barrier. For example when a large vehicle impacts one barrier segment at a high angle (closer to perpendicular to the length of the barrier) this impact will tend to "shear" the connector elements rather that pull them apart in tension. It is believed that the curved connector elements will provide resistance to these lateral forces.

FIG. 8 illustrates in plan view a pair of connectors 112, 112' attached to respective end plates 133, 133' of adjacent barrier units (not shown). As can be seen, when one connector 112' is rotated 180° with respect to the other connector 112, the outwardly extending flange 128, 128' of each connector 112, 112' is receivable in a respective recess 126' of the other connector 112'. Similarly, the inwardly extending flange 124 is receivable in the recess 144' of the other connector 112'.

Many modifications may be made to the preferred embodiment of the disclosure described above without departing from the spirit and scope of the disclosure.

The invention claimed is:

1. A roadway barrier system comprising:
   first and second connectors, each connector comprising:
   a mounting section attached to an end of a respective roadway barrier unit, the mounting section comprising a web having inner and outer faces;
   first and second connector elements at respective sides of the mounting section;
   the first connector element comprising an inwardly extending flange that is spaced from the inner face of the mounting section to at least partially define a recess therebetween;
   the second connector element comprising an outwardly extending flange joined to the mounting section by a web, wherein the second connector element is devoid of an inwardly extending flange;
   the inwardly and outwardly extending flanges of the respective first and second connector elements being dimensioned and orientated such that, when the first and second connectors, each having the same configuration, are each mounted at respective ends of adjacent roadway barrier units and connected together, the outwardly extending flange of the first connector is received within and fully fills the recess of the second connector to form a flush-fitting attachment of the first and second connectors to prevent relative roadway barrier unit translation and rotation, and to form a roadway barrier.

2. The roadway barrier system of claim 1, wherein the outer face of the mounting section is mounted to an outer surface of an end wall of the respective roadway barrier unit via at least one of screws, bolts, welds, and a connected bracket that is cast into barrier material.

3. A roadway barrier unit, comprising:
first and second connectors, each connector at opposite ends of a roadway barrier unit body, each connector having the same configuration, and each connector comprising:
   a mounting section attached to a respective end of the roadway barrier unit body, the mounting section having inner and outer faces;
   first and second connector elements at respective sides of the mounting section;
   the first connector element comprising an inwardly extending flange that is spaced from the inner face of the mounting section to at least partially define a recess there between;
   the second connector element comprising an outwardly extending flange joined to the mounting section, wherein the second connector element is devoid of an inwardly extending flange;
   the inwardly and outwardly extending flanges being dimensioned and orientated such that both flanges extend to a distal end in the same direction and that, when the first connector of a first roadway barrier unit and a second connector of an adjacent roadway barrier unit are connected together, the outwardly extending flange of the first connector of the first roadway barrier unit is received within and fully fills the recess of the second connector of the adjacent roadway barrier unit to form a flush-fitting attachment that prevents relative roadway barrier unit translation and rotation, and to form a roadway barrier.

4. The roadway barrier unit of claim 3, wherein the outwardly extending flange of the second connector element of each connector has generally the same contour and orientation as the inwardly extending flange of the first connector element of each connector.

5. The roadway barrier unit of claim 4, wherein the inwardly and outwardly extending flanges each have a generally arcuate profile.

6. The roadway barrier unit of claim 3, wherein respective webs of each connector extend between each of the outwardly and inwardly extending flanges and the mounting section.

7. The roadway barrier unit of claim 3, with each connector having a unitary construction.

8. A method of assembling a roadway barrier, by connecting together a series of roadway barrier units, comprising the steps of:
   (a) providing a plurality of roadway barrier units of claim 4, with the connectors of each roadway barrier unit in a similar orientation with respect to a respective adjacent roadway barrier unit; and
   (b) engaging one connector of the roadway barrier unit with the connector of the adjacent roadway barrier unit by inserting the outwardly extending flange of the connector of the roadway barrier unit into the recess of the connector of the adjacent roadway barrier unit.

9. The method of claim 8, wherein the connectors of the adjacent roadway barrier units are orientated at substantially 180° with respect to each other in the assembled roadway barrier.

10. The method of claim 8, wherein step (b) includes vertically aligning the respective connectors of an adjacent pair of roadway barrier units, then lowering one roadway barrier unit into engagement with the other roadway barrier unit.

11. The roadway barrier system of claim 1, further comprising more than two roadway barrier units connected together in an end-to-end relationship.

12. The roadway barrier system of claim 1, wherein the first and second connectors have chamfered edges.

13. The roadway barrier unit of claim 3, wherein the first and second connectors have chamfered edges.

14. The roadway barrier system of claim 1, wherein at least one of the first and second connectors comprises steel plate or a plastic material such as polycarbonate.

15. The roadway barrier unit of claim 3, wherein at least one of the first and second connectors comprises steel plate or a plastic material such as polycarbonate.

* * * * *